United States Patent

[11] 3,607,427

| | | | |
|---|---|---|---|
| [72] | Inventor | Donald W. White | |
| | | Burnt Hills, N.Y. | |
| [21] | Appl. No. | 797,144 | |
| [22] | Filed | Feb. 6, 1969 | |
| [45] | Patented | Sept. 21, 1971 | |
| [73] | Assignee | General Electric Company | |

[54] ELECTRICALLY COUPLED FUEL CELL AND HYDROGEN GENERATOR
4 Claims, 4 Drawing Figs.

[52] U.S. Cl. .................................................. 136/86, 204/129
[51] Int. Cl. ........................................................ H01m 27/14
[50] Field of Search ........................................... 136/86; 204/1.06, 1.07, 129

[56] References Cited
UNITED STATES PATENTS

| 3,132,972 | 5/1964 | Ludwig .......................... | 204/129 X |
| 3,402,230 | 9/1968 | White, Jr. ...................... | 136/86 X |
| 3,451,911 | 6/1969 | Tannenberger et al. ....... | 204/129 X |
| 3,453,146 | 7/1969 | Bawa et al. .................... | 136/86 |
| 3,489,670 | 1/1970 | Maget ........................... | 136/86 |

Primary Examiner—Allen B. Curtis
Attorneys—Richard R. Brainard, Paul A. Frank, Charles T. Watts, Leo I. Ma Lossi, Frank L. Neuhauser, Oscar B. Waddell and Joseph B. Forman ABSTRACT: A solid oxygen-ion electrolyte fuel cell electrically coupled directly to a solid oxygen-ion electrolyte water dissociation cell (for the generation of hydrogen) is described. Hydrocarbon fuel is reacted with air and/or steam to produce a reducing gas mixture, which is admitted to the coupled cells to depolarize the anode of the dissociation cell and serve as fuel for the fuel cell. The fuel cell produces low voltage direct current useable, as produced, by the dissociation cell and, when these cells are directly coupled electrically, either cell will automatically adjust to altered operating conditions or cell characteristics of the other cell.

Inventor
Donald W. White
by Leo J. MaLossi
His Attorney

ELECTRICALLY COUPLED FUEL CELL AND HYDROGEN GENERATOR

BACKGROUND OF THE INVENTION

Solid oxygen-ion electrolyte fuel cell structures for operation at elevated temperatures are broadly old. Such fuel cells employ in combination a solid oxygen-ion electrolyte layer having electrodes at opposite faces thereof, fuel and oxygen supplies in communication with the respective electrodes and electrical leads connected to the respective electrodes.

Such fuel cell structures have been used to generate low voltage direct current power and have also been used as instrument components to detect the presence of oxygen. When operated in reverse (electrical power supplied to the electrodes) such constructions will function as oxygen pumps or oxygen concentrators.

In U.S. Pat. application Ser. No. 742,699 of Aker et al., filed July 5, 1968, the electrical and chemical coupling of a solid oxygen-ion water dissociation cell with a thermal power generator is described. The aforementioned application is assigned to to the assignee of the instant invention and is incorporated herein by reference.

The instant invention provides for an even greater interdependence in that it now becomes possible with this combination to easily adjust design and operating parameters for optimum economic trade off between fuel cost and plant cost. Also, this invention permits the adjustment of the fuel consumption rate to keep the hydrogen production rate constant during the life of a plant, in spite of changes in cell characteristics (cell resistances and polarization voltages).

SUMMARY OF THE INVENTION

Means are provided to produce a reducing gas mixture, which preferably is first passed through the anode chamber of a high-temperature solid oxygen-ion electrolyte cell structure, where oxygen from the dissociation of water vapor into hydrogen and oxygen, chemically reacts with the reducing gas flow. The hot reducing gas flow (not being completely oxidized) is then passed through the anode chamber of a high-temperature oxygen-ion electrolyte fuel cell electrically coupled directly with the aforementioned dissociation cell. Here oxidization of more of the reducing gas flow occurs by chemical reaction with oxygen extracted from air admitted to the fuel cell cathode. The low voltage direct current produced by the fuel cell supplied the necessary power for the dissociation operation.

BRIEF DESCRIPTION OF THE DRAWING

The exact nature of this invention as well as objects and advantages thereof will be readily apparent from consideration of the following specification relating to the annexed drawing in which.

DESCRIPTION OF THE PREFERRED EMBODIMENT

Figure 1:
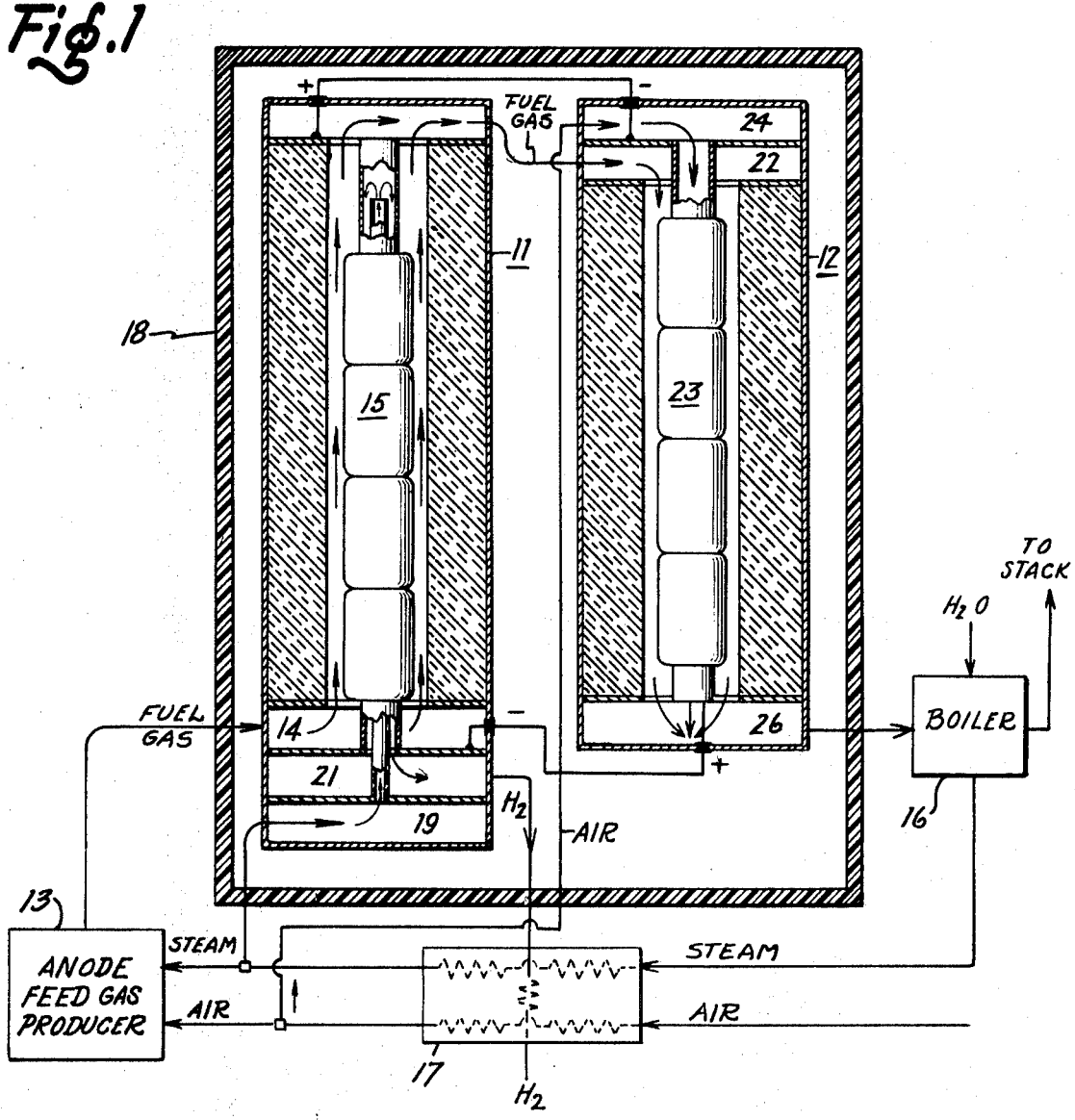
FIG. 1 is a schematic representation showing the direct electrical coupling between a dissociation cell module and a fuel cell module and, in addition, exemplary supporting components, and FIGS. 2a, 2b and 2c, graphically display respectively, the electrical behavior of a single depolarized-anode dissociation cell, a single fuel cell and the operative interrelationship and automatic compatibility potential made possible by the combination of the two cells according to this invention

The flowsheet of FIG. 1 schematically represents the combination of a hydrogen generator 11, which may for example comprise a module housing an array of stacks of solid oxygen-ion electrolyte dissociation cells substantially as described in the Aker et al. application electrically coupled to a module 12 housing a plurality of stacks of solid oxygen-ion electrolyte fuel cells constructed substantially in accordance with the disclosure in U.S. Pat. application Ser. No. 465,624 of White, filed June 21, 1965, now patent No. 3,402,250. Various electrode and electrolyte constructions for use in such cell stacks are described in the following patent applications: Ser. No. 645,288—Mitoff, filed June 12, 1967; Ser. No. 680,245—Spacil, filed Nov. 2, 1967, now U.S. Pat. No. 3,503,809 and Ser. No. 645,423—Tedmon et al., filed June 12, 1967. All of the above-mentioned patent applications are assigned to the assignee of the instant invention and all are incorporated by reference herein.

Hydrocarbon fuels, such as particulate coal or gas, are admitted to and burned in feed gas producer 13 in the presence of air and/or steam to produce a reducing gas mixture. This reducing gas is then conducted to anode manifold 14 of hydrogen generator 11 from which it is circulated over the anode surfaces of the stacks 15 of water dissociation cells therein. If necessary, this anode feed gas may be purified and/or heated before being passed into contact with the anode surfaces. As the reducing gas flow passes up over the anode surface area of the dissociation cells, some of the carbon monoxide and hydrogen content thereof becomes electrochemically oxidized to form carbon dioxide and water by reaction with oxygen emanating from the oxygen-ion electrolyte layer. This oxygen will have been produced by dissociation of steam at the dissociation cell cathode surface area, after which the oxygen ions formed will have been transported through the electrolyte barrier separating the anode and cathode of each cell.

Steam both for dissociation in hydrogen generator 11 and for use in feed gas producer 13 may be produced in boiler 16 and then passed into heat exchange relation with the very hot hydrogen output of hydrogen generator 11 in heat exchanger 17. Similarly air for use in feed gas producer 13 and fuel cell module 12 is heated in heat exchanger 17.

Coupled units 11 and 12 are shown enclosed in a common insulated structure 18 although they may be housed separately.

In both the dissociation cells and the fuel cells it is to be understood that the electrodes are porous and the electrolyte layers are nonporous.

The generation of hydrogen in the solid oxygen ion electrolyte dissociation cells in hydrogen generator 11 involves the phenomenon of dissociation, rather than of electrolysis, because there are no ions present in solution as would be the case with electrolysis. Water converted to steam in boiler 16 and heated in heat exchanger 17 is conducted to cathode manifold 19 from where it is distributed to dissociation cell stacks 15 via steam inlet pipes 21, which operate at some elevated temperature (preferably in excess of 800° C).

Heating of both the dissociation cell module 11 and the fuel cell module 12 to operating temperature is usually accomplished by the Joulean heating of the composite electrode/electrolyte structure of each cell due to the passage of the dissociating current therethrough from anode to cathode plus some other form of heating, if required, such as electrical resistance heating or combustion of a fuel.

The power distribution assembly would be designed so that direct current power from the fuel cell module would be directly applied to the dissociation cell module, the path of electron flow being from fuel cell anode to dissociation cell cathode and from dissociation cell anode to fuel cell cathode as shown.

At each dissociation cell cathode, the steam is dissociated into hydrogen and oxygen and each atom of oxygen accepts two electrons to become an oxygen ion. Each oxygen ion is then transported across the solid oxygen-ion electrolyte layer to the dissociation cell anode. At the anode, the oxygen ions release electrons (as has been noted above), which flow to the cathode of each fuel cell in module 12, and simultaneously react with the reducing gas present.

Figure 2A:
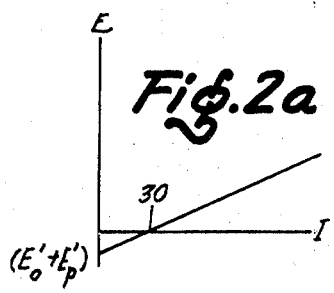

By supplying reducing gas to the anode manifold 14 in excess of the amount needed for stoichiometric combination with the transported oxygen, the voltage of each solid oxygen-ion electrolyte dissociation cell is reduced. This behavior is known as "depolarization." In effect, the electrical power required from fuel cell module 12 for the dissociation of steam in dissociation cell module 11 is reduced sharply. The open circuit voltage of each dissociation cell may actually reach a negative value as is shown in FIG. 2a (ordinate $E'_o+E'_p$) depending upon the composition of the reducing gas.

In any practical application of this invention each dissociation cell will be operated at a current density greater than that represented by point 30 (FIG. 2a) so that the dissociation cell will not be self-driven. The value of $E'_o+E'_p$ will typically be in the range of about +0.1 to −0.3 volts per cell.

Following oxidation at the anode surface areas of the dissociation cells, the effluent anode gas, still containing substantial amounts of carbon monoxide and hydrogen at a temperature close to the operating temperature of the dissociation cell module 11 then passes to the anode manifold 22 of fuel cell module 12, from which it is distributed to the anode surface of stacks 23, where more of the carbon monoxide and hydrogen content thereof is electrochemically oxidized, this time by oxygen removed from air supplied to the fuel cell cathodes (via cathode manifold 24), converted to oxygen ions, transported through the solid electrolyte material and exiting at the anode surfaces of each fuel cell stack 23.

If desired, of course, the reducing gas mixture produced in feed gas producer 13 could be cycled first to the fuel cell module 12 and then to the dissociation cell module 11 or could be conducted to both anode manifolds (14 and 22) in a parallel flow arrangement.

The benefits derived from using fuel cell power for driving the dissociation cells as described herein are the elimination of the need for power conditioning e.g., rectification and voltage control for power from an AC source and voltage control for power from a DC source. As a result simplification of electrical control (no need for external control) and regulation of the combined dissociation cell—fuel cell device are achieved. Fuel cells characteristically produce low voltage direct current, which is directly applicable to dissociation cells. The advantage of simplified electrical control regulation is illustrated in FIG. 2 wherein in each of FIGS. 2a, 2b and 2c E (average unit cell voltage) is plotted against I (total equivalent current, which has the same value as total electrical power divided by unit cell voltage) for a single cell.

Figure 2B:
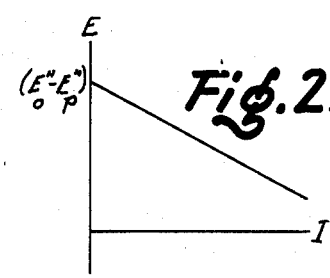
Figure 2C:
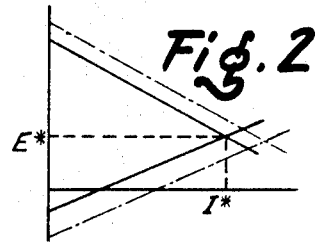

The electrical behavior of a single depolarized-anode dissociation cell is characterized graphically in FIG. 2a, while the electrical behavior of a single solid oxygen-ion electrolyte fuel cell is characterized in FIG. 2b. The respective equations for the straight lines shown are:

FIG. 2a (dissociation cell)

(1) $E=E'_o+E'_p+IR'$

FIG. 2b (fuel cell)

(2) $E=E''_o-E''_p-IR''$, where average unit cell open circuit voltages for the dissociation cell and fuel cell, respectively, are symbolized by $E'_o$ and $E''_o$; unit cell polarization voltages, by $E'_p$ and $E''_p$; and average unit cell resistances, by $R'$ and $R''$. Typical values for $E'_o+E'_p$ would be in the range of about +0.1 to −X0.3 volts/cell, while typical values for $E''_o+E''_p$ would be in the range of from about 0.8 to 1.2 volts/cell.

When the two E vs. I curves of FIGS. 2a and 2b are plotted together in FIG. 2c (the solid lines), the point of intersection of these lines defines the particular values of $E$ and $I$ (designated as $E^*$ and $I^*$) to which these particular combined, dissociation cells and fuel cells would adjust in operation. The equation defining these values are:

(3) $$I^* = \frac{(E_0''-E_0')-(E_p'+E_p'')}{R'+R''}$$

(4) $$E^* = \frac{(E_0''-E_p'')(R')+(E_0'+E_p')(R'')}{R'+R''}$$

The intimate interdependence of the dissociation cell structure and fuel cell structure connected according to this invention and the resultant self-regulation of one or the other in the combination may be illustrated by considering the effect on the combined system of increasing the fuel consumption rate in feed gas producer 13. The immediate effect of such a change would be to lower the average stage of oxidation of the anode gas passing through both cell modules, thereby causing a decrease in the value of $E'_o$ and an increase in the value of $E''_o$. These changes in voltage result in an increase in $I^*$ in accordance with equation 3 above, these changes being reflected schematically by the dot-dash lines in FIG. 2c. This dependence of $I^*$ and $E'_o$ and $E''_o$ permits ready optimization in design for a given set of economic conditions e.g. fuel cost, selling price of hydrogen, plant cost, taxes, return on investment, etc. Once is plant is in operation, flexibility is such that operation is possible at design $I^*$ or at other than design $I^*$. Thus, if the market value of hydrogen or fuel cost changes an appropriate change in hydrogen production rate can readily be made by changing the operating current by adjusting the fuel consumption rate.

Since increasing of the fuel consumption rate increase the hydrogen production rate, such adjustment of fuel consumption rate enables the maintenance of a constant hydrogen production rate during the life of a plant should cell characteristics ($R'$, $R''$, $E'_p$, $E''_p$) change.

Although not shown, conventional instrumentation would be located at appropriate places in the system to give the plant personnel readings indicative of hydrogen production rate, current employed and voltage.

The effluent anode gas from the fuel cell module 12, which may still contain some CO and $H_2$, may be conducted to compartment 26 for combustion with the effluent air from the fuel cell module cathodes to provide added heat to keep the cells hot. The hot combustion products are finally led to heat recovery boiler 16, where steam to be fed to the dissociation cell cathodes is generated. To maximize thermal efficiency, one or more heat exchangers 17 may be incorporated into the system to transfer sensible heat from the product $H_2$ to the steam feed for the dissociation cells and/or for the anode gas producer 13 and to the air for the fuel cells and/or anode gas producer 13. Alternate arrangements could involve utilizing the sensible heat of the $H_2$ to generate steam and employing the combustion product heat to preheat the air and/or steam.

What I claim as new and desired to secure by Letters Patent of the United States is:

1. Apparatus for the production of hydrogen by the dissociation of water vapor comprising in combination:
   a. a first module containing at least one solid oxygen-ion electrolyte dissociation cell for generating hydrogen, said dissociation cell including an anode and a cathode
   b. a second module containing at least one solid oxygen-ion electrolyte fuel cell for generating direct current power, said fuel cell including an anode and a cathode, said second module being directly electrically coupled to said first module such that the fuel cell anode area is electrically connected to the dissociation cell cathode area and the dissociation cell anode area is electrically to the fuel cell cathode area,
   c. means connected to said first module for supplying reducing gas flow to the dissociation cell anode area,
   d. means connected to said second module for supplying reducing gas flow from said first module to the fuel cell anode area,
   e. means connected to said first module for supplying steam to the dissociation cell cathode area,
   f. means connected to said second module for supplying an oxygen-containing gas to the fuel cell cathode area and
   g. means connected to said first module for receiving hydrogen gas generated at the dissociation cell cathode area.

2. The apparatus for the production of hydrogen by the dissociation of water vapor as recited in claim 1 wherein the first and second modules are enclosed in a common insulated housing.

3. The apparatus for the production of hydrogen by the dissociation of water vapor as recited in claim 1 wherein the means for receiving the hydrogen gas generated is connected to a heat exchange device.

4. The apparatus for the production of hydrogen by the dissociation of water vapor as recited in claim 1 wherein the means connected to the second module for supplying reducing gas flow to the fuel cell anode area is a flow conduit connecting the first and second modules.